US008928622B2

(12) United States Patent
Wang et al.

(10) Patent No.: US 8,928,622 B2
(45) Date of Patent: Jan. 6, 2015

(54) DEMODULATION METHOD AND SYSTEM WITH LOW COMMON NOISE AND HIGH SNR FOR A LOW-POWER DIFFERENTIAL SENSING CAPACITIVE TOUCH PANEL

(75) Inventors: Hsin-Hao Wang, Tainan (TW); Yen-Lin Huang, Taipei (TW)

(73) Assignee: Orise Technology Co., Ltd., Hsinchu (TW)

( * ) Notice: Subject to any disclaimer, the term of this patent is extended or adjusted under 35 U.S.C. 154(b) by 519 days.

(21) Appl. No.: 13/323,854

(22) Filed: Dec. 13, 2011

(65) Prior Publication Data

US 2012/0194469 A1 Aug. 2, 2012

(30) Foreign Application Priority Data

Feb. 1, 2011 (TW) .............................. 100103888 A

(51) Int. Cl.
G06F 3/045 (2006.01)
G06F 3/044 (2006.01)
G06F 3/041 (2006.01)

(52) U.S. Cl.
CPC ............. *G06F 3/044* (2013.01); *G06F 3/0416* (2013.01)
USPC ....................................................... 345/174

(58) Field of Classification Search
CPC .............................. G06F 3/0488; G06F 3/044

USPC ..................... 345/173–175; 178/18.01–20.04
See application file for complete search history.

(56) References Cited

U.S. PATENT DOCUMENTS

| 2003/0012288 | A1* | 1/2003 | Zhou ............................. 375/260 |
| 2007/0132737 | A1* | 6/2007 | Mulligan et al. ............. 345/173 |
| 2011/0007021 | A1* | 1/2011 | Bernstein et al. ............ 345/174 |
| 2011/0063154 | A1* | 3/2011 | Hotelling et al. ............ 341/143 |
| 2011/0080353 | A1* | 4/2011 | Kang et al. ................... 345/173 |
| 2011/0163992 | A1* | 7/2011 | Cordeiro et al. ............. 345/174 |
| 2012/0026131 | A1* | 2/2012 | Bytheway et al. ............ 345/174 |

* cited by examiner

*Primary Examiner* — Joe H Cheng
*Assistant Examiner* — Hang Lin
(74) *Attorney, Agent, or Firm* — Bacon & Thomas, PLLC

(57) ABSTRACT

In a demodulation system for a low-power differential-sensing capacitive touch panel, the capacitive touch panel has n first conductor lines in a first direction and m second conductor lines in a second direction, and a mutual capacitance is generated at each intersection of the n first conductor lines and the m second conductor lines. The demodulation system has a signal generator, a detection circuit, a programmable gain amplifier, an analog to digital converter. During a driving cycle, the signal generator generates a pair of differential driving signals to drive two of the first conductor lines in the first direction for eliminating common noises of the two first conductor lines and avoiding the common noises from being amplified by the programmable gain amplifier.

16 Claims, 9 Drawing Sheets

DEMODULATION METHOD AND SYSTEM WITH LOW COMMON NOISE AND HIGH SNR FOR A LOW-POWER DIFFERENTIAL SENSING CAPACITIVE TOUCH PANEL

CROSS REFERENCE TO RELATED APPLICATION

This application claims the benefits of the Taiwan Patent Application Serial Number 100103888, filed on Feb. 1, 2011, the subject matter of which is incorporated herein by reference.

BACKGROUND OF THE INVENTION

1. Field of the Invention

The present invention relates to the technical field of touch panels and, more particularly, to a demodulation method and system for a low-power differential sensing capacitive touch panel.

2. Description of Related Art

The modern consumer electronics are typically provided with touch panels for use as an input device. To meet with the requirements of light and compactness, a touch pad is usually combined with a display panel to form a touch panel for allowing a user to conveniently input data. Upon the sensing principle, touch pads are classified into four types including resistive type, capacitive type, surface acoustic wave type, or optics type.

The principle of a touch panel is based on different sensing manners to detect a voltage, current, acoustic wave, or infrared to thereby detect the coordinate of a touching point on a screen as touched by a finger or other object. For example, a resistive touch panel uses a voltage difference between the upper and lower electrodes to compute the position of a pressed point for detecting the location of the touching point, and a capacitive touch panel uses a capacitance change generated in electrostatic combination between the arranged transparent electrodes and the touching part of a human body to generate a current or voltage for detecting the coordinate of the touching point.

FIG. 1 is a schematic view of driving a typical n×m capacitive touch panel, where n, m are each an integer greater than one. As shown in FIG. 1, a signal generator 110 sequentially generates a driving signal Vin at each of the conductor lines X1 to Xn in one direction, and mutual capacitances $C_{(1,1)}$ to $C_{(n,m)}$ produced between the conductor lines X1 to Xn and the conductor lines Y1 to Ym in the other direction are employed to couple charges into the conductor lines Y1 to Ym. The detection circuit 120 has m sensing circuits 121 for measuring the charges so as to generate corresponding voltage signals Vo_1 to Vo_m.

When there is no grounded conductor or finger is close to the touch panel, the value of the mutual capacitance $C_{(x,y)}$ is Cm0. When there is a grounded conductor or finger close to the touch panel, the electric lines of force between the conductor lines X1 to Xn and Y1 to Ym may be interfered to negatively affect the values of mutual capacitances (with a value of Cm1 at contact, for example). The sensing circuits 121 measure the charges according to the change of the mutual capacitance and further generate the voltage signals Vo_1 to Vo_m.

FIG. 2 is a circuit diagram of a typical sensing circuit 121, and FIG. 3 schematically illustrates a sequence of driving signals Vin generated by the typical signal generator 110.

It is known in FIG. 3 that the signal generator 110 sequentially inputs a driving signal Vin to each of the conductor lines X1 to Xn in one direction. The driving signal Vin includes one or more pulses. The signal generator 110 uses the driving signal Vin to drive the conductor line X1 at Cycle 1, to drive the conductor line X2 at Cycle 2, and so on.

The generated pulses in the X direction pass through the coupling charges of the mutual capacitance $C_{(1,1)}$ to $C_{(n,m)}$ between the conductor lines X1 to Xn and Y1 to Ym and reach to the conductor lines Y1 to Ym in the Y direction. In this case, the sensing circuits 121 of the detection circuit 120 collect the coupling charges to thereby generate the voltage signals Vo_1 to Vo_m, so as to determine the change of the mutual capacitance according to the change of the voltage signals Vo_1 to Vo_m, and further determine whether an object approaches to the touch panel according to the change of the mutual capacitance.

In FIG. 2, $C_{(x,y)}$ indicates a mutual capacitance between a conductor line X and a conductor line Y. As shown in FIG. 2, when the pulses of the input driving signal Vin are inputted, the generated voltages are required to charge or discharge the integral capacitors $C_0$ of the sensing circuits 121, wherein a sensing circuit 121 accumulates a voltage of $$|Vo| = \left|Vin\frac{C_{(x,y)}}{C_0}\right|,$$

which causes an additional power consumption. In addition, the common noises generated in the signal generator 110 and the conductor lines X1 to X3, such as a VCOM voltage generated in an LCD driver or a power noise generated in an LED driver, are detected and amplified by the sensing circuits 121, resulting in that the SNR (signal to noise ratio) is greatly decreased and the generated touch coordinate becomes unstable or even inaccurate.

Therefore, it is desirable for the above method for detecting a capacitive touch panel to be improved.

SUMMARY OF THE INVENTION

The object of the present invention is to provide a demodulation method and system for a low-power differential-sensing capacitive touch panel for reducing the affection of common noises and obtaining the optimal SNR to further increase the accuracy on a touch coordinate, wherein, when there is no touch, an integral capacitor of a detection circuit is not charged or discharged to thereby avoid the additional power consumption and thus reduce the power consumption.

In one aspect of the invention, there is provided a demodulation system for a low-power differential sensing capacitive touch panel with n first conductor lines in a first direction and m second conductor lines in a second direction, where n, m are each an integer greater than one, wherein a mutual capacitance is formed at each intersection of the first and the second conductor lines and the first direction is vertical to the second direction. The system comprises: a signal generator having n voltage drivers connected to the n first conductor lines of the capacitive touch panel for driving the n first conductor lines; a detection circuit having m sensing circuits for detecting the mutual capacitances and further generating corresponding m detection signals; a programmable gain amplifier connected to the detection circuit for amplifying the in detection signals and generating m amplified detection signals; and an analog to digital converter connected to the programmable gain amplifier for converting the m amplified detection signals into m digital detection signals; wherein, in a driving cycle, the signal generator drives two of the n first conductor lines by using a pair of differential signals which are identical in amplitude but opposite in phase so that the differential signals generated by the signal generator have identical positive and negative charges for eliminating common noises of the two first conductor lines, and an output voltage of the detection circuit is kept at a DC common voltage when there is no touch on the capacitive touch panel.

In another aspect of the invention, there is provided a demodulation method for a low-power differential-sensing capacitive touch panel for determining whether a grounded conductor touches the capacitive touch panel which has n first conductor lines in a first direction and m second conductor lines in a second direction vertical to the first direction, where n, m are each an integer greater than one, a mutual capacitance being formed at each intersection of the first and the second conductor lines. The method comprises the steps of: (A) using a signal generator to drive the n first conductor lines, wherein the signal generator has n voltage drivers connected to the n first conductor lines, respectively; (B) using a detection circuit to detect the mutual capacitances of the m second conductor lines, and further generate corresponding m detection signals; (C) using a programmable gain amplifier to amplify the m detection signals, and further generate m amplified detection signals; and (D) using an analog to digital converter to convert the m amplified detection signals into m digital detection signals; wherein, in a driving cycle, the signal generator drives two of the n first conductor lines by using a pair of differential signals which are identical in amplitude but opposite in phase so that the differential signals generated by the signal generator have identical positive and negative charges for eliminating common noises of the two first conductor lines, and an output voltage of the detection circuit is kept at a DC common voltage when there is no touch on the capacitive touch panel.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
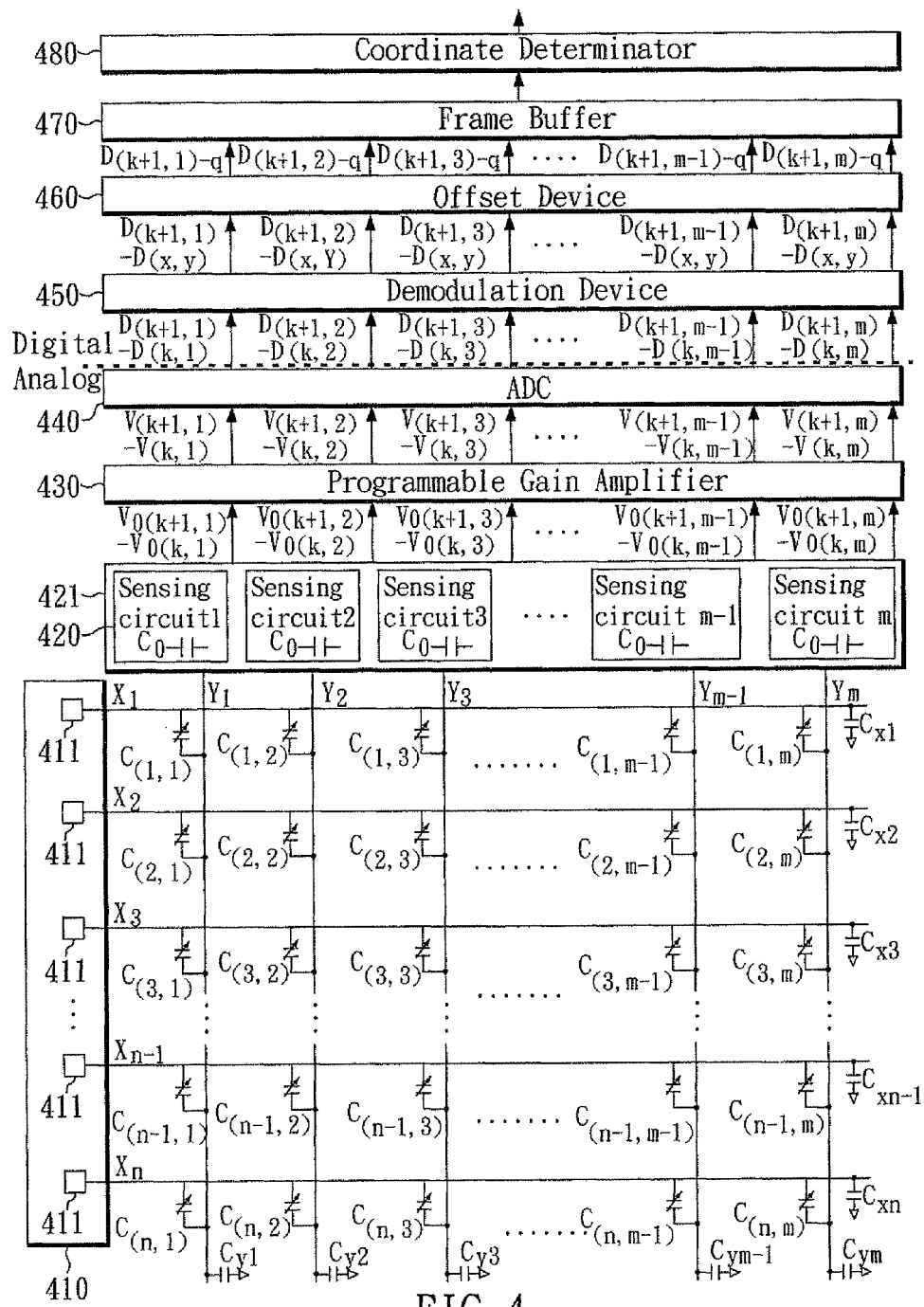
FIG. 4 is a block diagram of a demodulation system for a low-power differential sensing capacitive touch panel according to an embodiment of the invention.

FIG. 4 is a block diagram of the demodulation system 400 for a low power differential sensing capacitive touch panel according to an embodiment of the invention. The capacitive touch panel has n first conductor lines X1 to Xn in a first direction and in second conductor lines Y1 to Ym in a second direction, where n, m are each an integer greater than one. A mutual capacitance $C_{(x,y)}$ is generated at each intersection between the first conductor lines X1 to Xn and the second conductor lines Y1 to Ym, wherein the first direction is vertical to the second direction. The demodulation system 400 includes a signal generator 410, a detection circuit 420, a programmable gain amplifier 430, an analog to digital converter (ADC) 440, a demodulation device 450, an offset device 460, a frame buffer 470, and a coordinate determinator 480.

The signal generator 410 has n voltage drivers 411 connected to the n first conductor lines X1 to Xn of the capacitive touch panel for driving the n first conductor lines X1 to Xn.

Figure 1:
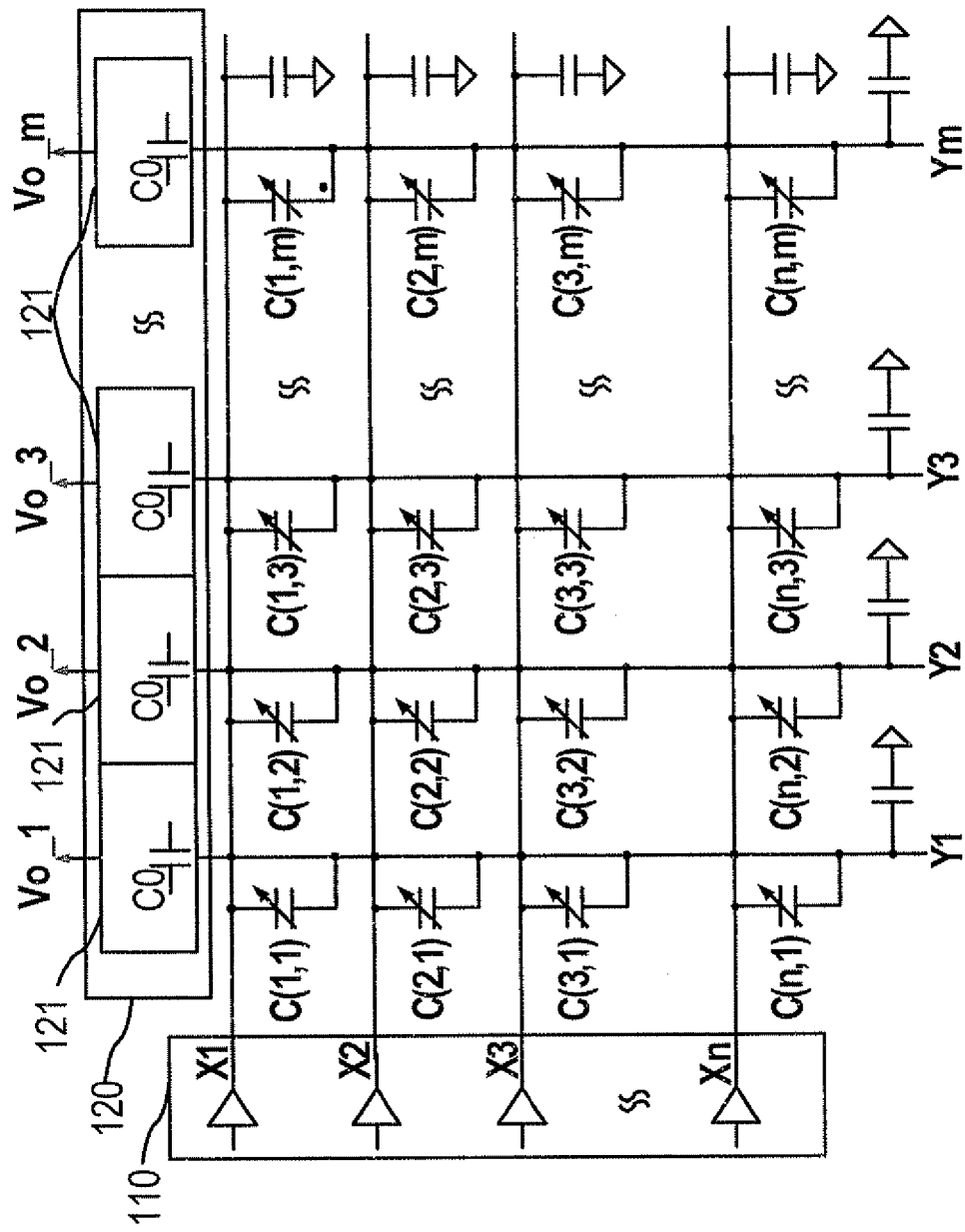
FIG. 1 is a schematic view of driving a typical n×m capacitive touch panel.
Figure 2:
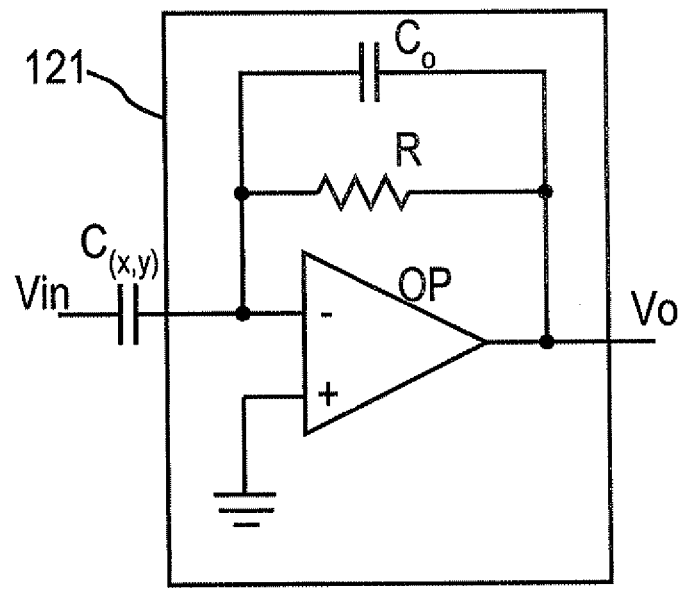
FIG. 2 is a circuit diagram of a typical sensing circuit.
Figure 3:
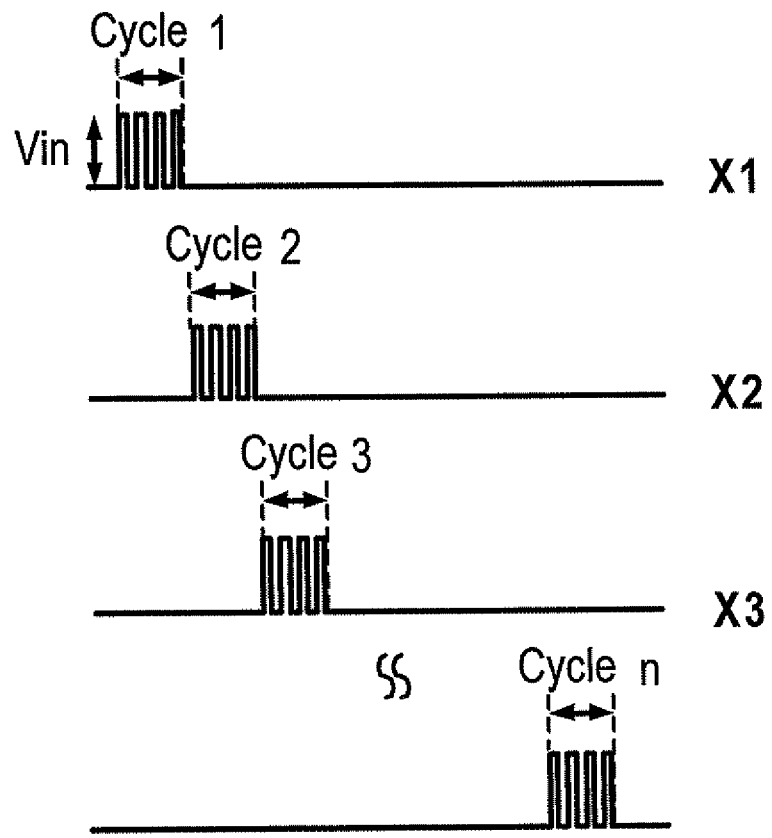
FIG. 3 schematically illustrates a sequence of driving signals generated by a typical signal generator.

The detection circuit 420 has m input terminals for detecting the mutual capacitances at the intersections between the m second conductor lines Y1 to Ym and each of the n first conductor lines X1 to X11 and generating corresponding m detection signals. The detection circuit 420 has m sensing circuits 421 wherein the j-th sensing circuit 421 detects the mutual capacitance and generate corresponding j detection signals Vo(k+1,j)−Vo(k,j), where j=1, 2, 3, ..., m, and k=1, 2, 3, ..., n−1. As shown in FIG. 2, each sensing circuit 421 is configured to include an integral capacitor Co, a resistor R, and an operational amplifier OP.

The programmable gain amplifier 430 is connected to the detection circuit 420 for amplifying the m detection signals and further generating m amplified detection signals.

The ADC 440 is connected to the programmable gain amplifier 430 for converting the m amplified detection signals into m digital detection signals.

During a driving cycle, the signal generator 410 uses a pair of differential signals to respectively drive two of the n first conductor lines X1 to Xn at the same time. The differential signals generated by the signal generator 410 are identical in amplitude but opposite in phase, and thus the positive and negative charges of the differential signals generated by the signal generator 410 are equal, so as to eliminate common noises of the two first conductor lines thereby avoiding the common noises from being amplified by the programmable gain amplifier 430.

The two of the n first conductor lines X1 to Xn, which are driven respectively by the differential signals generated by the signal generator 410, can be adjacent, for example. The differential signals generated by the signal generator 410 can be square wave, sine wave and/or triangle wave.

Since the capacitive touch panel has n first conductor lines X1 to Xn, the signal generator 410 uses the differential signals to respectively drive two first conductor lines X1 and X2 during a first driving cycle, to respectively drive two first conductor lines X2 and X3 during a second driving cycle, and so on. Hence, the capacitive touch panel has n−1 driving cycles, and the detection circuit 420 generates (n−1)×m detection signals.

The demodulation device 450 is connected to the ADC 440 for demodulating the (n−1)×m digital detection signals into n×m digital signals.

The offset device 460 is connected to the demodulation device 450 for performing an offset adjustment on the n×m digital signals to thereby generate n sets of m (n×m) offset signals.

The frame buffer 470 is connected to the offset device 460 for temporarily storing the n sets of m offset signals sequentially outputted by the offset device 460.

The coordinate determinator 480 is connected to the frame buffer 470 for determining whether a grounded conductor or a finger touches on the capacitive touch panel according to the change of the n×m offset signals.

Figure 5:
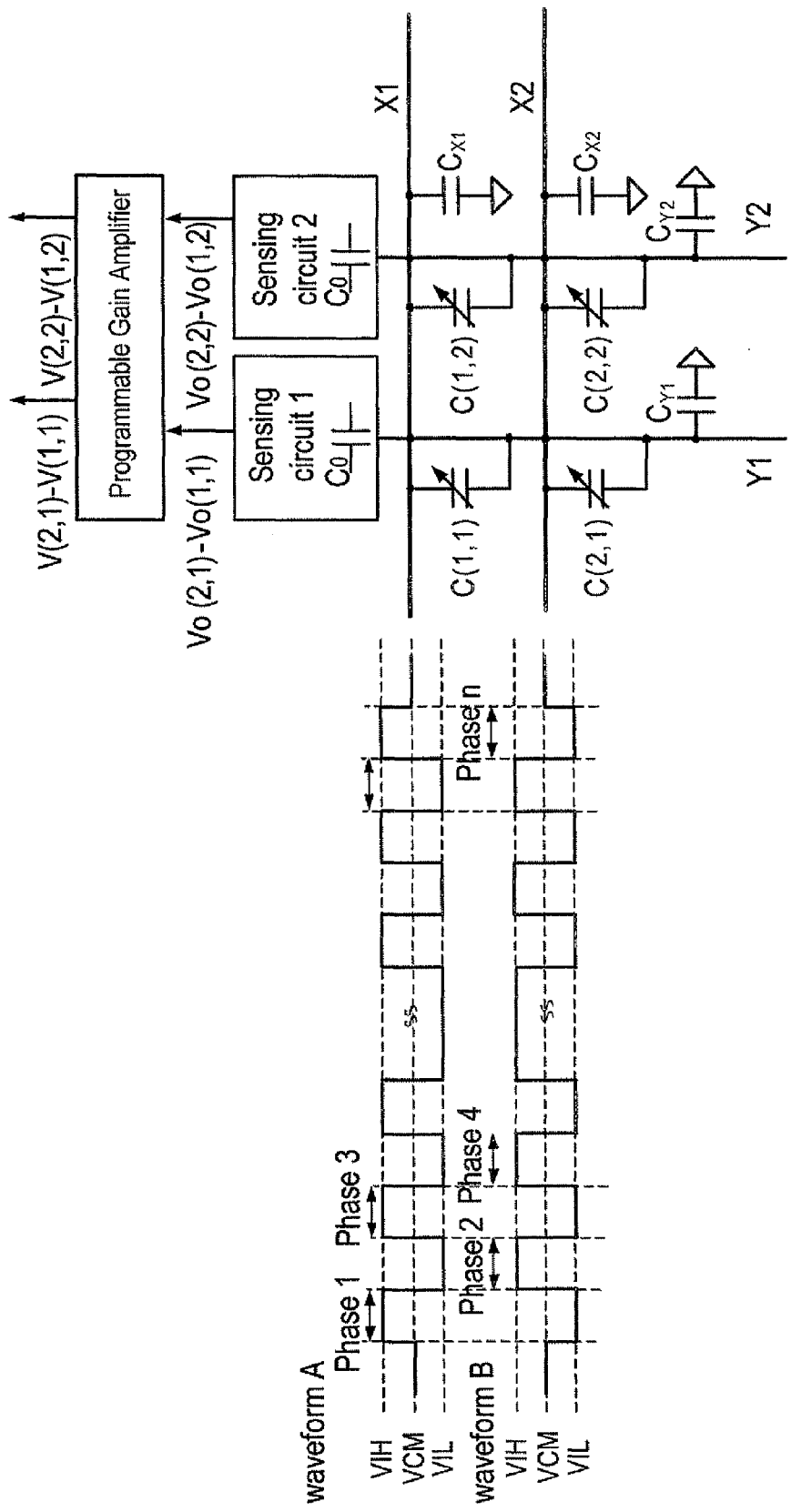
FIG. 5 is a schematic diagram of a demodulation system for a low-power differential sensing capacitive touch panel equivalent to a 2×2 panel, according to an embodiment of the invention.

For convenient description, a 2×2 panel is given as an example to describe the present invention. FIG. 5 is a schematic diagram of a demodulation system for a low power differential sensing capacitive touch panel equivalent to a 2×2 panel, according to an embodiment of the invention. In FIG. 5, it is characterized in that a differential signal generated by the signal generator 410 is used to control different phases. When the grounded conductor or the finger does not touch the capacitive touch panel, the differential signal generated by the signal generator 410 does not charge or discharge the integral capacitor Co of the sensing circuit 421 to thereby achieve a detection circuit with low power consumption.

At phase one, the differential signal generated by the signal generator 410 has a voltage of waveform A that changes from VCM to VIH, where VCM has a value between the voltages VIH and VIL. The voltage of waveform A charges the mutual capacitance C(1, 1) and C(1, 2), and the integral capacitors Co of the sensing circuits 1, 2 generate the voltages Vo(1, 1) and Vo(1, 2), which are respectively expressed as:

$$Vo(1, 1) = (VIH - VCH) * \frac{C(1, 1)}{C0},$$
$$Vo(1, 2) = (VIH - VCM) * \frac{C(1, 2)}{C0}.$$

Therefore, at phase one, the voltage of waveform A generated by the signal generator 410 contributes positive charges to Vo(1,1) and Vo(1, 2) on the basis of VCM.

Similarly, at phase one, the differential signal generated by the signal generator 410 has a voltage of waveform B that changes from VCM to VIL. At this moment, the voltage of waveform B charges the mutual capacitance C(2, 1) and C(2, 2), and the integral capacitors Co of the sensing circuits 1, 2 generate the voltages Vo(2, 1) and Vo(2, 2), which are respectively expressed as:

$$Vo(2, 1) = (VCM - VIL) * \frac{C(2, 1)}{C0},$$
$$Vo(2, 2) = (VCM - VIL) * \frac{C(2, 2)}{C0}.$$

Therefore, at phase one, the voltage of waveform B generated by the signal generator 410 contributes negative charges to Vo(2,1) and Vo(2, 2) on the basis of VCM.

Figure 6:
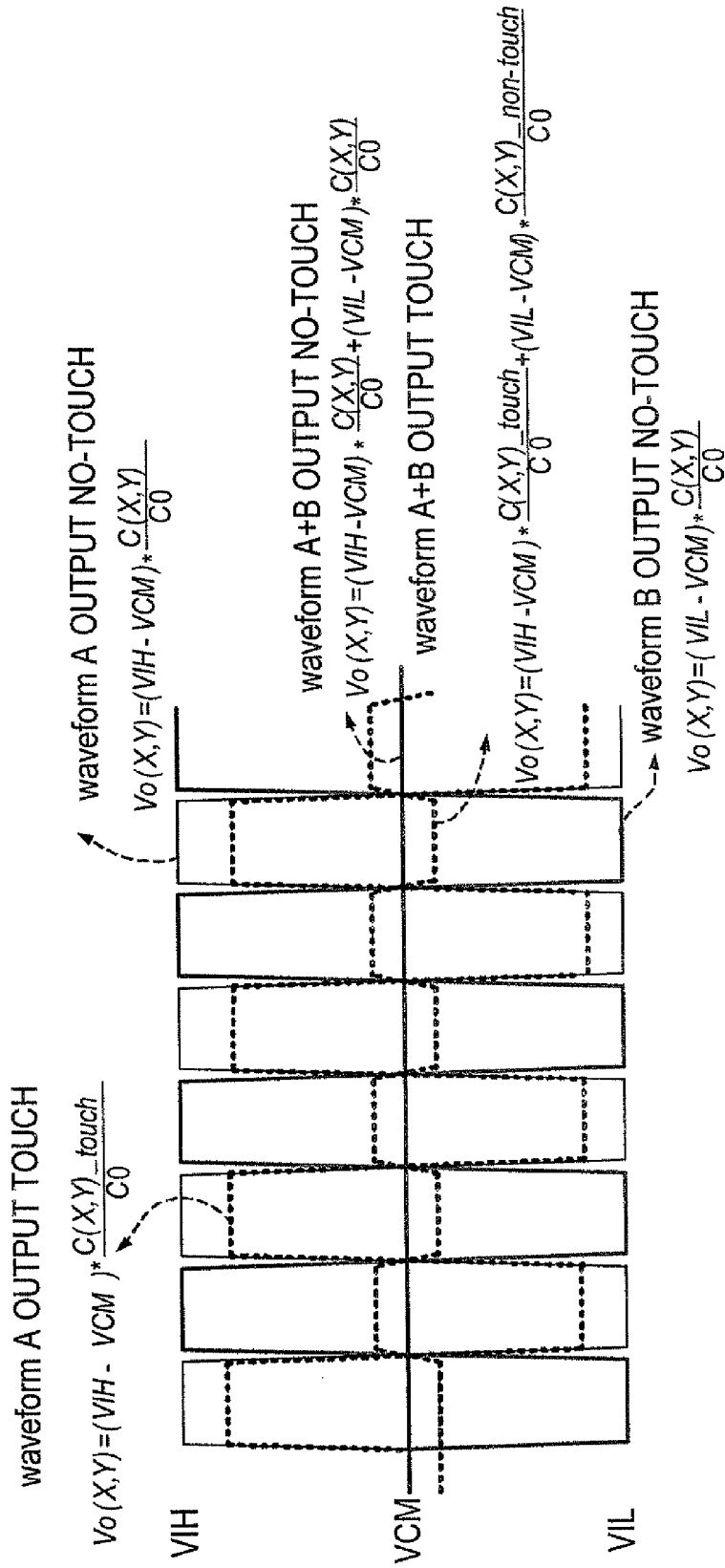
FIG. 6 is a schematic diagram of output waveforms of sensing circuits at different conditions according to an embodiment of the invention.

FIG. 6 is a schematic diagram of output waveforms of sensing circuits at different conditions according to an embodiment of the invention. Because the differential signals (i.e., waveform A and waveform B) generated by the signal generator 410 have the same positive and negative charges, we have VIH-VCM=VCM-VIL, and Vo(2, 1)−Vo(1, 1) generated by the sensing circuit 1 and Vo(2, 2)−Vo(1, 2) generated by the sensing circuit 2 are kept unchanged, as shown in FIG. 6. In other phases, such as phases two, three, four, and so on, the operation principle is identical, and thus a detailed description is deemed unnecessary.

As shown in FIG. 6, when there is no object close to or touched on the touch panel, the positive charges of waveform A and the negative charges of waveform B are added so that an output voltage of the sensing circuits 1 and 2 is kept at the DC common voltage VCM. When an object approaches to or touches on the touch panel, the output voltage of the sensing circuits 1 and 2 is either increased or reduced as the positive charges of waveform A and negative charges of waveform B are added. Hence, the differential signals (waveform A and waveform B) generated by the signal generator 410 charge the integral capacitors Co of the sensing circuits 1 and 2 only when there is a touch occurred, and the output voltage of the sensing circuits 1 and 2 remains at VCM when there is no touch occurred. That means, there is no additional power, thereby achieving the purpose of low power consumption. Namely, the output voltage of the sensing circuits 421 of the detection circuit 420 is kept at a DC common voltage VCM when there is no touch behavior occurred on the capacitive touch panel.

In the prior art, when an object approaches to or touches on the touch panel, the change of the mutual capacitance $C_{(1,1)}$–$C_{(n,m)}$ is very small, and thus the first conductor lines X1 to Xn and the second conductor lines Y1 to Ym are affected by the external common noises, resulting in that the signals detected by the sensing circuits encounter a jitter and accordingly the generated touch coordinate becomes unstable or the signal to noise ratio (SNR) of the system is greatly reduced.

Therefore, in the present invention, the output signal of the signal generator 410 is designed to be differential, and the pulse outputted at each cycle is based on two conductor lines, so that the detection circuit 420 can detect the subtracted voltages Vo(2, 1)−Vo(1, 1) and Vo(2, 2)−Vo(1, 2) from the two conductor lines, and the common noises affected on the detection circuit 420 can thus be eliminated. In this case, even the adjacent first conductor lines X1 to Xn or second conductor lines Y1 to Ym are very close to each other, the signals concurrently generated by the two conductor lines on touching are not canceled.

The voltage Vo(2, 1)−Vo(1, 1) detected by the sensing circuit 1 and the voltage Vo(2, 2)−Vo(1, 2) detected by the sensing circuit 2 are amplified by the programmable gain amplifier 430 and converted into digital signals by the ADC 440, which are then restored to single-channel signals by the demodulation device 450.

Figure 7:
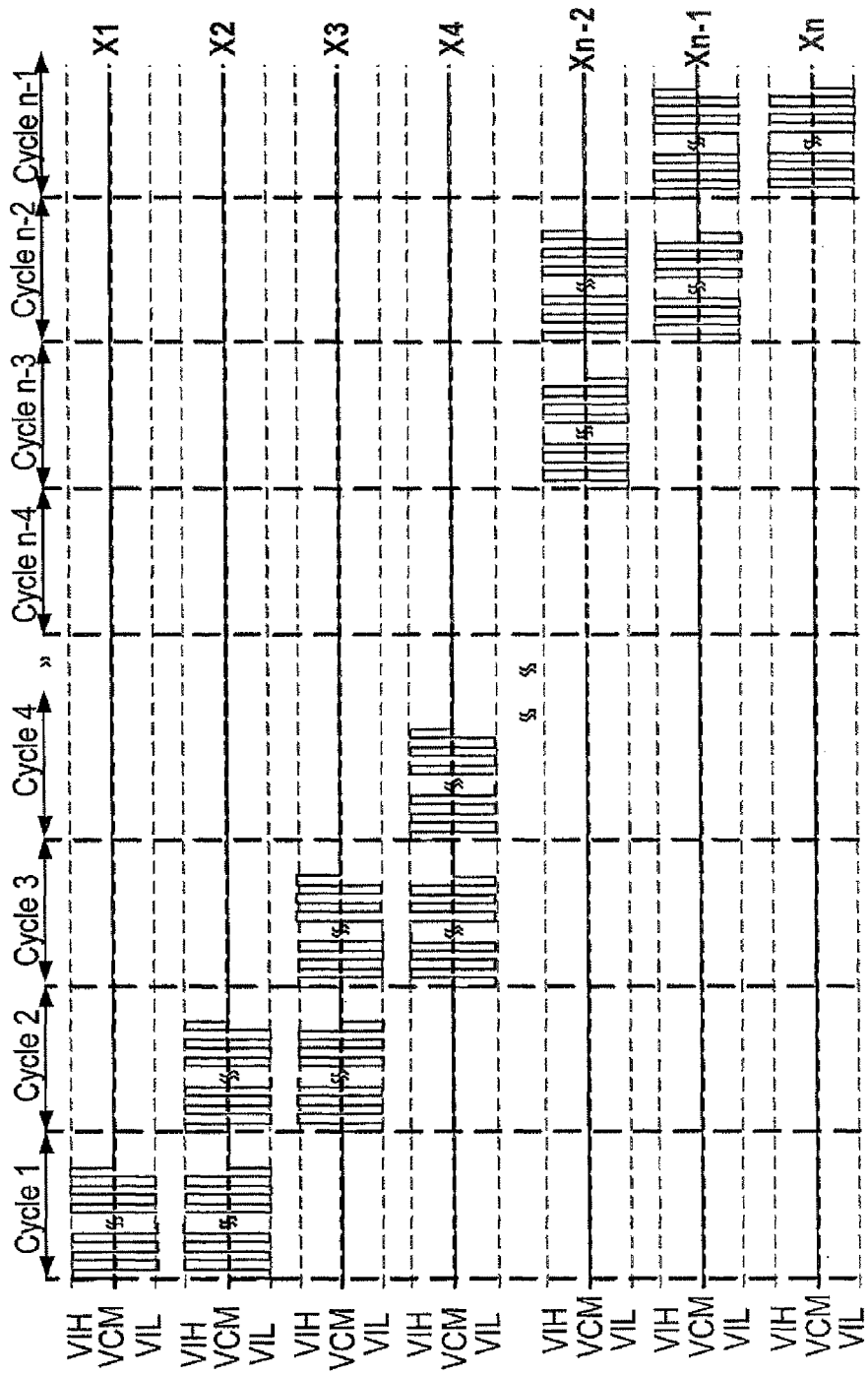
FIG. 7 is a schematic diagram of a driving waveform generated by a signal generator according to an embodiment of the invention.

It is known in FIG. 4 that the touch panel has a resolution of n×m. At least a pulse, for example a square, a sine, or a triangle wave, is inputted to the i-th and (i+1)-th conductor lines in the first direction (X direction). FIG. 7 is a schematic diagram of a driving waveform generated by the signal generator 410 according to an embodiment of the invention. As shown in FIG. 7, the signal generator 410 outputs a pulse based on two conductor lines in the first direction during every cycle. For example, the first conductor lines X1 and X2 are driven at cycle one, the first conductor lines X2 and X3 are driven at cycle two, and so on.

As shown in FIG. 7, in the same cycle, the driving waveforms of two first conductor lines in the first direction are phase-inverted, and the adjacent driving waveforms of each of the two first conductor lines are also phase-inverted. For example, at cycle one, the first conductor line X1 has a driving waveform with a positive phase, and the first conductor line X2 has a driving waveform with an inverted phase. However, the driving waveform of the first conductor line X2 has the positive phase at cycle two.

The pulse generated on the first conductor line passes through the mutual capacitance between the first (X direction) and second (Y direction) conductor lines for coupling charges to the second (Y direction) conductor line. The direction circuit 420 has m sensing circuits 421 to detect voltage signals Vo(k+1, 1)–Vo(k, 1) through Vo(k+1, m)–Vo(k, m) which are induced by the coupling charges of the mutual capacitance, where k is the number of output signal cycles of the signal generator 410, and k=1, 2, . . . , n−1. Accordingly, the number of first conductor lines are n, and each sensing circuit 421 requires determining (n−1) cycles of data. Therefore, for data in a frame, each sensing circuit 421 can obtain (n−1) voltages, Vo(k+1, 1)–Vo(k, 1) to Vo(k+1, m)–Vo(k, m).

Then, the generated (n−1) voltages are amplified into an input range suitable for the ADC 440 by the programmable gain amplifier 430, and the amplified voltages are further converted into digital signals D(k+1,1)–D(k,1) to D(k+1, m)–D(k,m) by the ADC 440. The demodulation device 450 demodulates the digital detection signals for restoring the digital signals to the single channel associated data, D(k+1, 1)–D(X,Y) to D(k+1, m)–D(X,Y).

The demodulation device 450 has m demodulators 451, where a j-th demodulator sequentially outputs zero directly, and performs an addition on the digital detection signals during the (k+1)-th driving cycle, the k-th driving cycle, and during the 1 to (k−1)-th driving cycles to generate a (k+1)-th digital signal for output, where j=1, 2, 3, . . . , m, and k=1, 2, 3, . . . , (n−1).

Figure 8:
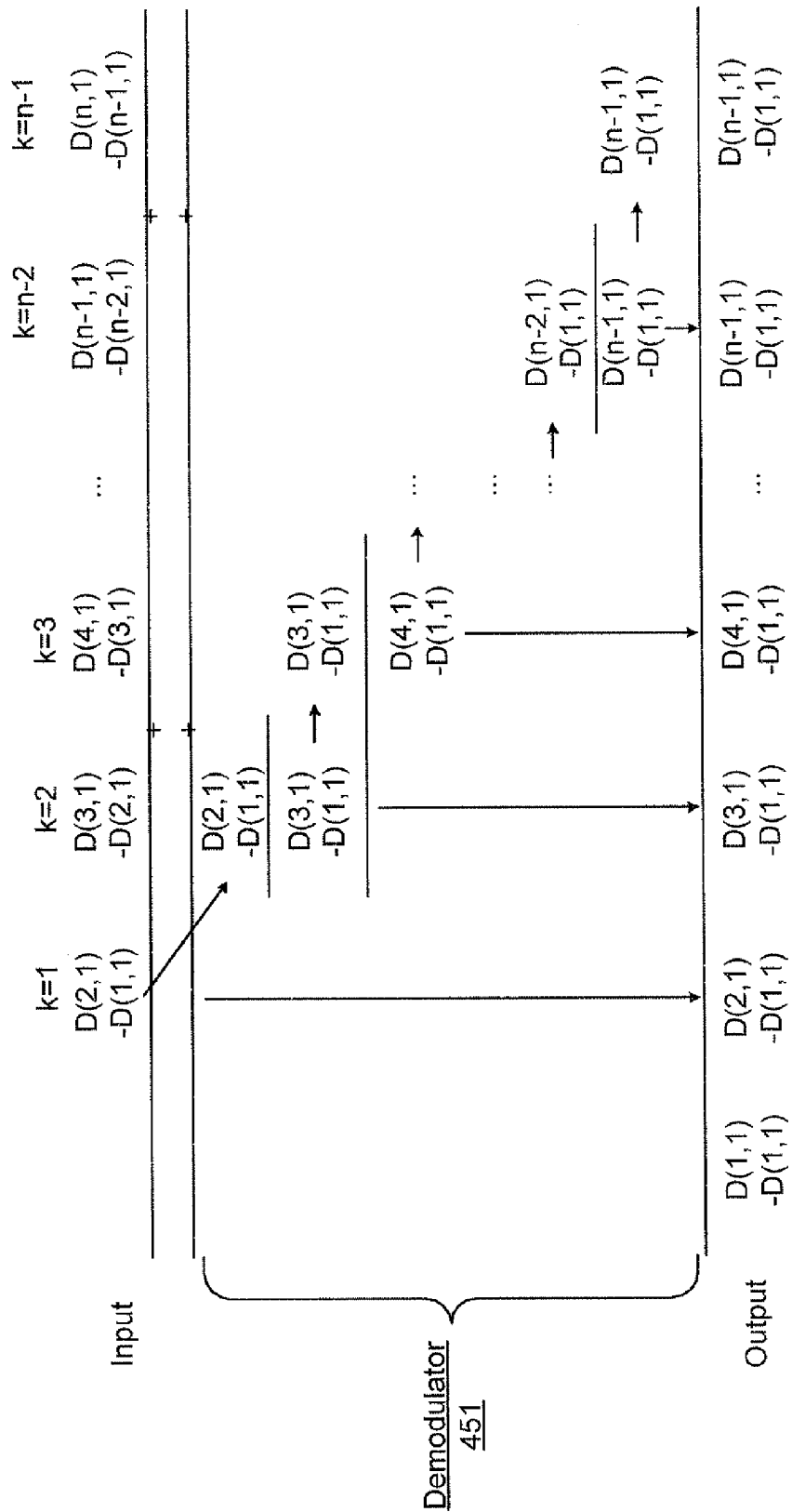
FIG. 8 is a schematic diagram of the operation of the first demodulator according to an embodiment of the invention.

FIG. 8 is a schematic diagram of the operation of the first demodulator 451 according to an embodiment of the invention. As shown in FIG. 8, the first demodulator 451 has an input of D (k+1, 1)–D(k, 1) and an output of D(k, 1)–D(X,Y), and in this embodiment D(X,Y)=D(1,1), where the demodulation is performed on the basis of k=1–(n−1) (for data of one frame). At first, the demodulator 451 outputs zero (D (1, 1)–D(1, 1)). For k=1 it indicates that a digital detection signal D(2, 1) of X2 during the first driving cycle and a digital detection signal D(1, 1) of X1 during the first driving cycle are subtracted to thereby generate the first digital signal D(2, 1)–D(1, 1) for output. For k=2, it indicates that the digital detection signal D(3,1)–D(2,1) during the second driving cycle and the output digital signal D(2,1)–D(1,1) during the first driving cycle are added to generate a second digital signal D(3,1)–D(1,1) for output, and so on. However, in practical application, the signal D(X, Y) can be replaced by other signals such as D(1, n−3) or D(3, 5).

The data restored by the demodulation device 450 is applied through the offset device 460 to output D (k+1,1)–q to D(k+1, m)–q, where q indicates an environment variable calculated from all the data, such as min(D(n:1)). The offset device 460 adds a programmable constant q in the n×m digital signals respectively to thereby output the n×m offset signals. After the offset device 460 performs an offset adjustment on D (k+1,1)–q to D(k+1, m)–q, the frame buffer 470 stores all data of the entire frame for the coordinate determinator 480 to further determine whether a conductor or finger touches on the panel, resulting in that the amount of coupling charges are changed, and further D (k+1,1)–q to D(k+1, m)–q are changed. It is determined that a conductor or finger touches on the panel, and a coordinate calculation is performed to find the touch coordinate.

Figure 9:
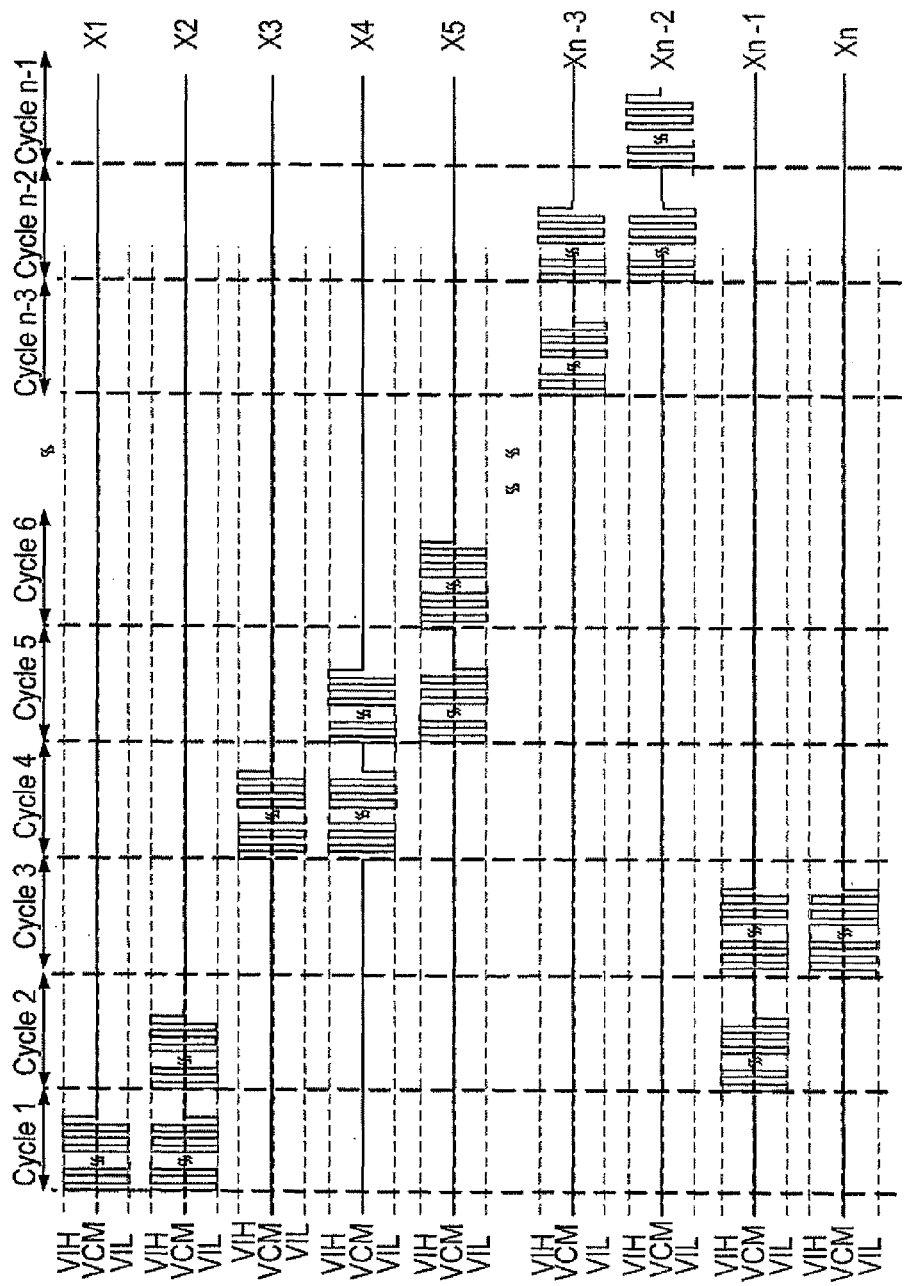
FIG. 9 is a schematic diagram of another driving waveform generated by a signal generator according to an embodiment of the invention.

FIG. 9 is a schematic diagram of another driving waveform generated by the signal generator 410 according to an embodiment of the invention. Because of the manufacturing process, the capacitive touch panel has a larger offset at its perimeter, and the transparent electrodes on the panel have an irregular pattern. Accordingly, the 1 to I lines or (n−I) to n lines of the detection circuit 420 on the panel may generate the mutual capacitance with higher load. In this case, in a direction (first direction) with a higher load, the I and (n−I)-th first conductor lines, the I−1 and (n−I+1)-th first conductor lines, . . . , the second and (n−1)-th first conductor lines, or the (n−1)-th and n-th first conductor lines are inputted with one or more pulses respectively to drive the mutual capacitance with high load. Next, the k-th and (k+1)-th first conductor lines are inputted with one or more pulses to drive the mutual capacitance with low load, where k>I. Thus, such a segmentation way is applied to subtract any digital signal D(X, Y) in different loads detected by the sensing element of each first conductor line itself for reducing charging and discharging on the integral capacitors of the detection circuit. As shown in FIG. 9, in a given example of the first conductor lines X1, X2, Xn−1, Xn with a high load and X3–Xn−2 with a low load, in which I is equal to 2, the signal generator 410 generates a driving waveform. The signal generator 410 uses the differential signals to respectively drive the first and second conductor lines of the n first conductor lines at cycle one, to respectively drive the second and (n−1)-th conductor lines of the n first conductor lines at cycle two, to respectively drive the (n−1)-th and n-th conductor lines of the n first conductor lines at cycle 3, to respectively drive the (p−1)-th and n-th conductor lines of the n first conductor lines at cycle p, where 4≤p≤n−2, and to respectively drive the (n−2)-th conductor lines of the n first conductor lines at cycle (n−1).

As shown in FIG. 9, in the same cycle, the two first conductor lines in the first direction are phase inverted in waveform, and on the same line, the driving waveform at consecutive cycles is also phase inverted. For example, at cycle one, the phase of a waveform driving the first conductor line X1 is positive, and the waveform driving the first conductor line X2 is phase inverted. At cycle two, the phase of a waveform driving the first conductor line X2 is positive, and the waveform driving the first conductor line Xn−1 is phase inverted. In addition, the phase of the waveform driving the first conductor line X2 is phase inverted at cycle one, but positive at cycle two.

Figure 10:
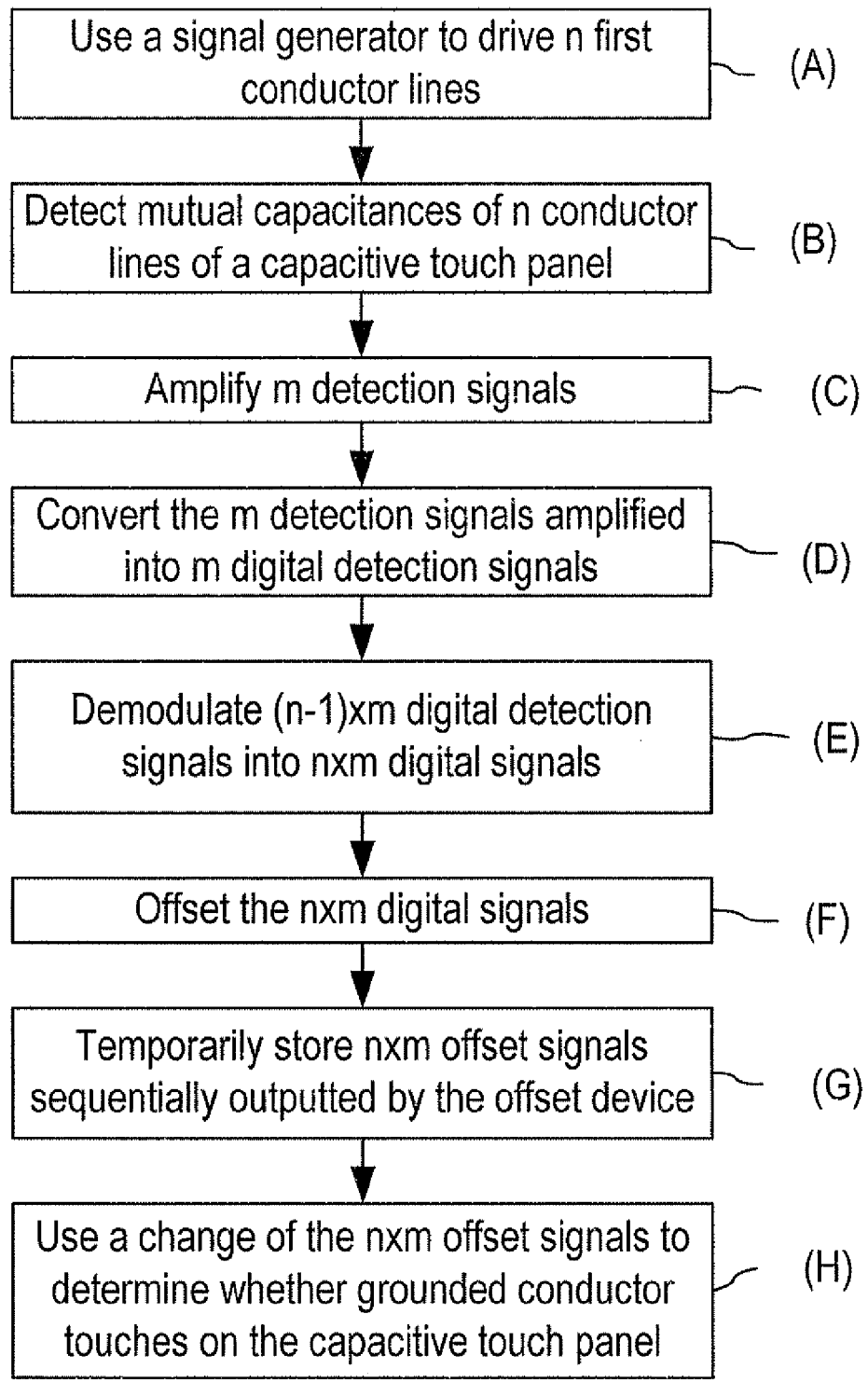
FIG. 10 is a flowchart of a demodulation method for a low-power differential sensing capacitive touch panel according to an embodiment of the invention.

FIG. 10 is a flowchart of a demodulation method for a low power differential sensing capacitive touch panel according to an embodiment of the invention. In FIG. 10, the demodulation method is used in the capacitive touch panel in order to detect a grounded conductor to thereby determine whether the conductor touches on the capacitive touch panel. As shown in FIGS. 4 and 10, the capacitive touch panel has n first conductor lines X1 to Xn in a first direction and m second conductor lines Y1 to Ym in a second direction, where n, m are each an integer greater than one. A mutual capacitance is formed at each intersection of the first and the second conductor lines. The first direction is vertical to the second direction. First, in step (A) of the method, a signal generator 410 is used to drive the n first conductor lines, wherein the signal generator 410 has n voltage drivers 411 connected to the n first conductor lines respectively. In a driving cycle, the signal generator 410 uses a pair of differential signals to drive two of the n first conductor lines, and the differential signals generated by the signal generator 410 have the same positive and negative charges for eliminating common noises of the two first conductor lines and avoiding the common noises from being amplified by a programmable gain amplifier 430. The two conductor lines of the n first conductor lines that are concurrently driven by the differential signals generated by the signal generator 410 are adjacent. The differential signals generated by the signal generator 410 can be a square, sine, or triangle wave. The capacitive touch panel has (n−1) driving cycles. A detection circuit 420 generates (n−1)×m detection signals.

In step (B), the detection circuit 420 is used to detect the mutual capacitance of the m second conductor lines, so as to generate corresponding m detection signals Vo(k+1, 1)−Vo(k, 1) to Vo(k+1, m)−Vo(k,m).

In step (C), the programmable gain amplifier 430 is used to amplify the m detection signals Vo(k+1, 1)−Vo(k, 1) to Vo(k+1, m)−Vo(k,m), so as to generate m amplified detection signals V (k+1, 1)−V(k,1) to V(k+1, m)−V(k,m).

In step (D), an analog to digital converter (ADC) 440 is used to convert the m amplified detection signals V (k+1,1)−V(k,1) to V (k+1, m)−V(k, m) into m digital detection signals D (k+1,1) D (k, 1) to D(k+1, m)−D(k,m).

In step (E), a demodulation device 450 is used to demodulate the (n−1)×m digital detection signals D(k+1,1)−D(k, 1) to D(k+1, m)−D(k,m) as n×m digital signals D(k+1,1)−D(X, Y) to D(k+1, m)−D(X, Y). The demodulation device 450 has m demodulator 451, where a j-th demodulator sequentially outputs zero directly, and performs an addition on the digital detection signals during the (k+1)-th driving cycle, the k-th driving cycle, and the 1 to (k−1)-th driving cycles to generate a (k+1)-th digital signal for output, where j=1, 2, m, and k=1, 2, 3, . . . , (n−1).

In step (F), an offset device 460 is used to perform an offset adjustment on the n×m digital signals D (k+1, 1)−D(X, Y) to D(k+1, m)−D(X, Y) so as to generate n sets of m offset signals, i.e., a total of n×m offset signals D(k+1, 1)−q to D(k+1, m)−q, where q is a programmable constant applied to the n×m digital signals by the offset device 460.

In step (G), a frame buffer 470 is used to temporarily store the n sets of the m offset signals, D (k+1, 1) q to D(k+1, m)−q, sequentially outputted by the offset device 460.

In step (H), a coordinate determinator 480 is used to determine whether the grounded conductor touches on the capacitive touch panel according to a change of the n×m offset signals D(k+1, 1)−q to D(k+1, m)−q.

From the aforementioned, the demodulator 451 outputs zero (D(1, 1)−D(1, 1)). For k=1, it indicates that a digital detection signal D(2, 1) of X2 during the first driving cycle and a digital detection signal D(1, 1) of X1 during the first driving cycle are subtracted to thereby generate the first digital signal D (2, 1)−D(1, 1) for output. For k=2, it indicates that the digital detection signal D(3,1)−D(2,1) during the second driving cycle and the output digital signal D(2,1)−D(1,1) during the first driving cycle are added to generate a second digital signal D(3,1)−D(1,1) for output, and so on. It is known that the digital detection signal D(3,1)−D(2,1) is a differential form, such that the common noise in first conductor lines X3 and X2 can be effectively diminished.

In view of the foregoing, it is known that the present invention is provided with the features as follows:

1. The common noises are eliminated by performing a subtraction on two adjacent first conductor lines. Since the first conductor lines detected by the detection circuit 420 are close to one another in every two first conductor lines, the interferences from the common noises to two first conductor lines are substantially the same, so that the subtraction can eliminate the common noises.

2. The voltage of the driving signal inputted by the signal generator 410 does not charge or discharge the integral capacitors of the detection circuit 420 without touch, and thus there is no additional power consumed, thereby achieving the detection circuit with low power consumption.

3. The adjacent first or second conductor lines can be very close to one another, without worrying about touching two conductor lines at the same time to generate signals simultaneously and thus encounter a signal cancellation. Therefore, the resolution of the detection in the invention is not affected.

Although the present invention has been explained in relation to its preferred embodiment, it is to be understood that many other possible modifications and variations can be made without departing from the spirit and scope of the invention as hereinafter claimed.

What is claimed is:

1. A demodulation system for a differential sensing applied in capacitive touch panel with n first conductor lines of a first direction and m second conductor lines of a second direction, where n, m are each an integer greater than one, wherein a mutual capacitance is formed at each intersection between the first and the second conductor lines and the first direction is vertical to the second direction, the demodulation system comprising:
a signal generator, having n voltage drivers connected to the n first conductor lines of the capacitive touch panel, for driving the n first conductor lines;
a detection circuit, having m sensing circuits, for detecting the mutual capacitances and generating m detection signals correspondingly, wherein the detection circuit generates (n−1)×m detection signals when the capacitive touch panel is operated with (n−1) driving cycles;
a programmable gain amplifier, connected to the detection circuit, for amplifying the (n−1)×m detection signals and generating (n−1)×m amplified detection signals;
an analog to digital converter, connected to the programmable gain amplifier, for converting the (n−1)×m amplified detection signals into (n−1)×m digital detection signals;
a demodulation device, connected to the analog to digital converter, for demodulating (n−1)×m digital detection signals into n×m digital signals; and
an offset device, connected to the demodulation device, for performing an offset adjustment on the n×m digital signals to thereby generate n×m offset signals;
wherein during a driving cycle, the signal generator drives two of the n first conductor lines by a pair of differential signals which are identical in amplitude but opposite in phase for eliminating common noises of the two first conductor lines, and an output voltage of the detection circuit is kept at a DC common voltage when there is no touch on the capacitive touch panel.

2. The demodulation system as claimed in claim 1, wherein the two first conductor lines driven by the differential signals are adjacent.

3. The demodulation system as claimed in claim 2, wherein the demodulation device has m demodulators, where a j-th demodulator sequentially outputs zero directly and performs an addition on the digital detection signal during the (k+1)-th driving cycle, the k-th driving cycle, and the 1 to (k−1)-th driving cycles to generate a (k+1)-th digital signal for output, where j=1, 2, 3, . . . , m, and k=1, 2, 3, . . . , (n−1).

4. The demodulation system as claimed in claim 3, wherein the offset device adds a programmable constant in the n×m digital signals to generate the n×m offset signals.

5. The demodulation system as claimed in claim 4, further comprising:
a frame buffer connected, to the offset device, for temporarily storing the n×m offset signals sequentially by the offset device; and a coordinate determinator, connected to the frame buffer, for determining whether a grounded conductor or a finger touches on the capacitive touch panel according to the n×m offset signals.

6. The demodulation system as claimed in claim 2, wherein the differential signals on said two first conductor lines are phase inverted in waveform, and the waveform of differential signal on one of the two first conductor lines is phase inverted with the third conductive lines.

7. The demodulation system as claimed in claim 1, wherein, when the capacitive touch panel has a relatively large offset at its perimeter and an irregular pattern of transparent electrodes thereon, the conductors lines are separated into two groups driving with the two groups of differential signals.

8. The demodulation system as claimed in claim 7, wherein the signal generator uses the differential signals to drive the first and the second ones of the first conductor lines during a first cycle, to drive the second and the (n−1)-th ones of the first conductor lines during a second cycle, to drive the (n−1)-th and the n-th ones of the first conductor lines during a third cycle.

9. A demodulation method for a differential sensing, capacitive applied in touch panel for determining whether there is a grounded conductor touching the capacitive touch panel, wherein the capacitive touch panel has n first conductor lines in a first direction and m second conductor lines in a second direction which is vertical to the first direction, where n, m are each an integer greater than one, and a mutual capacitance being formed at each intersection between the first and the second conductor lines, the demodulation method comprising the steps of:

(A) using a signal generator to drive the n first conductor lines, wherein the signal generator has n voltage drivers connected to the n first conductor lines, respectively;

(B) using a detection circuit to detect the mutual capacitances of the m second conductor lines, and further generate m detection signals correspondingly, wherein the detection circuit generates (n−1)×m detection signals when the capacitive touch panel operates with (n−1) driving cycles;

(C) using a programmable gain amplifier to amplify the (n−1)×m detection signals, and further generate (n−1)×m amplified detection signals;

(D) using an analog to digital converter to convert the (n−1)×m amplified detection signals into (n−1)×m digital detection signals;

(E) using a demodulation device to demodulate (n−1)×m digital detection signals into n×m digital signals; and (F) using an offset device to perform an offset adjustment on the n×m digital signals to generate n×m offset signals;

wherein, in a driving cycle, the signal generator drives two of the n first conductor lines by using a pair of differential signals which are identical in amplitude but opposite in phase for eliminating common noises of the two first conductor lines, and an output voltage of the detection circuit is kept at a DC common voltage when there is no touch on the capacitive touch panel by the grounded conductor.

10. The demodulation method as claimed in claim 9, wherein the two first conductor lines driven by the differential signals are adjacent.

11. The demodulation method as claimed in claim 10, wherein the demodulation device has m demodulators, where a j-th demodulator sequentially outputs zero directly and performs an addition on a digital detection signal of the (k+1)-th driving cycle and a digital signal of the k-th driving cycle to generate a (k+1)-th digital signal for output, where j=1, 2, 3, . . . , m, and k=1, 2, 3, . . . , (n−1).

12. The demodulation method as claimed in claim 10, wherein the differential signals on two first conductor lines are phase inverted in waveform, and the waveform of a differential signal on one of the two first conductor lines is phase inverted with the third conductive lines.

13. The demodulation method as claimed in claim 9, wherein the offset device adds a programmable constant in the n×m digital signals to generate the n×m offset signals.

14. The demodulation method as claimed in claim 9, further comprising:

(G) using a frame buffer to temporarily store the n×m offset signals sequentially outputted by the offset device; and (H) using a coordinate determinator to determine, based on the n×m offset signals, whether the grounded conductor touches on the capacitive touch panel.

15. The demodulation method as claimed in claim 9, wherein, when the capacitive touch panel has a relatively large offset at its perimeter and an irregular pattern of transparent electrodes thereon, the conductors lines are separated into two groups driving with the two groups of differential signals.

16. The demodulation method as claimed in claim 15, wherein the signal generator uses the differential signals to drive the first and the second ones of the first conductor lines during a first cycle, to drive the second and the (n−1)-th ones of the first conductor lines during a second cycle, to drive the (n−1)-th and the n-th ones of the first conductor lines during a third cycle.

* * * * *